United States Patent [19]

Baltzer et al.

[11] 3,996,515

[45] Dec. 7, 1976

[54] METHOD FOR FREQUENCY CROSS-COUPLING OF CHANNELS IN AN OMEGA NAVIGATION RECEIVER SYSTEM

[75] Inventors: Otto J. Baltzer; Spurgeon E. Smith, both of Austin, Tex.

[73] Assignee: Tracor, Inc., Austin, Tex.

[22] Filed: Apr. 28, 1975

[21] Appl. No.: 571,920

[52] U.S. Cl. .......................... 324/83 FE; 343/105 R
[51] Int. Cl.² ..................................... G01R 25/00
[58] Field of Search ................. 324/83 FE, 83 R; 343/105 R

[56] References Cited

UNITED STATES PATENTS 3,896,443  7/1975  Zitzow ........................ 324/83 FE Primary Examiner—Palmer C. Demeo
Assistant Examiner—Michael J. Tokar
Attorney, Agent, or Firm—Arnold, White & Durkee

[57] ABSTRACT

This invention relates generally to radio navigation receivers and particularly to multiple frequency phase tracking receivers in which phase information received from a network of transmitters, each radiating coherent signal energy on a plurality of discrete frequencies, is used for navigation or position determination. There is provided a method of updating positional information derived from the plurality of discrete frequency signals by cross-coupling the input to each of the discrete frequency receivers so as to reduce the lag time between receiving two sequential one-frequency signals and updating the signal.

10 Claims, 8 Drawing Figures

UPDATING CROSS-COUPLED COMPONENT AT END OF RECEIVED SEQUENCE FOR ONE STATION

UPDATING CROSS-COUPLED COMPONENTS AFTER RECEIVING EACH SIGNAL IN A SEQUENCE

METHOD FOR FREQUENCY CROSS-COUPLING OF CHANNELS IN AN OMEGA NAVIGATION RECEIVER SYSTEM

BACKGROUND OF THE INVENTION

Navigational systems which employ a plurality of transmitters transmitting on discrete frequencies are typically used for long range navigation. One such long range navigational system is known as the Omega navigational system and will, when completed, employ eight stations for worldwide surface or airborne navigation. The eight stations each broadcast on three discrete frequencies, the three frequencies being common to each of the eight stations. Omega is a very low frequency (VLF) navigation system operating in the allocated navigation band in the electromagnetic spectrum between 10 and 14 kHz. Global coverage will be obtained with eight transmitting stations.

A hyperbolic Omega receiver measures the phase of two of more Omega stations against a reference generated from an internal oscillator. The internal oscillator permits storage of the phase information so that the relative phases of the different stations can be intercompared. Readout is the phase difference in centicycles between selected stations and ordinarily is recorded continuously on strip chart recorders.

In order that the Omega receiver may determine which station is broadcasting, since all stations broadcast sequentially on the same frequencies, a signal format has been constructed such that each station employs a unique combination of signal duration for each of the three frequencies transmitted. That is, station A transmits the three frequencies sequentially for 0.9, 1.0 and 1.1 seconds, station B transmits for 1.0, 1.1 and 1.2 seconds, station C for 1.2, 1.1 and 1.0 seconds and so forth. By knowing this sequence associated with each station and measuring the duration of the signal, each station can be identified. Each station commences broadcasting its sequence of three frequencies once in every ten seconds. Thus, there is a ten-second delay between the broadcast of the first frequency and the rebroadcast of that frequency from that station. The Omega receiver provides positional information from each of the three frequencies, the positional information being combined into a useable signal for providing an operator with a visual indication of a reference point indicating location.

Basic Omega signals consists of very low frequency 10.2, 13.6 and 11.33 kHz continuous wave pulses. Since there are many requirements associated with transmitting multiple frequencies from multiple stations, an individual discrete frequency, for example 10.2 kHz, is transmitted from an individual station only once in each 10 seconds for a duration of approximately 1 second. Thus, for deriving positional information from a single station, the information is updated with a new signal only once in each 10 seconds. For aircraft moving at a high rate of speed, this interval between updating the position derived from the 10.2 kHz signal may be unsatifactory.

Futher, while each station broadcasts on three discrete frequencies, under adverse atmospheric or ionospheric conditions one or possibly two of the signals may be blanked out. In such event, were the 10.2 kHz signal blanked out for one or two cycles, the update may occur only once in 20 or 30 seconds, an entirely unsatisfactory time interval between corrections to the position derived from the 10.2 kHz input.

It is therefore one feature of this invention to provide a method for improving the reliability and accuracy of multiple frequency receiver navigational systems.

It is a further feature of this invention to maintain tracking even if one or several of the frequency signals from any one station is temporarily lost due to adverse atmospheric conditions.

It is yet another feature of this invention to apply a phase error correction derived from the 10.2 kHz signal to the 13.6 and 11⅓ kHz signals as the latter signals are received in sequence following the 10.2 kHz signal.

It is yet another feature of this invention to apply a phase error correction to a plurality of received discrete frequencies, the correction being derived from one sequence of signals and applied to the following sequence of signals either uniformly or with different scaling for each discrete frequency.

SUMMARY OF THE INVENTION

This invention relates to a unique method for improving the data derived from a plurality of discrete frequency transmitted signals, and may, for example, be utilized in an Omega navigation receiver. The method is not restricted to the Omega application, but can be used with other navigation/position location systems which are based on the precision phase measurement of discrete, multiple frequency carrier signals.

The method involves the cross-coupling of phase error signals derived from a comparison of each discrete signal with a reference signal, and is applied to the individual frequency channels such that each phase tracking loop filter processing a particular frequency transmitted by a particular station receives supplemental phase error information from the processing of the adjacent remaining signals as well as the usual phase error signal derived by its own phase detector. By providing an updated phase error signal to the subsequently transmitted frequency from the initially transmitted frequency, there is provided more frequent updating of the phase error signal. Consequently there will be less error contained within the informational data derived from the sequentially or simultaneously transmitted discrete frequencies.

DESCRIPTION OF THE PREFERRED EMBODIMENT

Although the method of processing discrete frequency signals is applicable to any system utilizing a plurality of discrete frequencies transmitted by one station, it will be herein described with reference to the Omega navigational system.

The basic Omega hyperbolic navigation system utilizes the sequential transmission of three navigation frequencies (at 10.2, 13.6 and 11.1-⅓ kHz) from each of eight transmitters spaced apart around the world. The multiple frequencies are used for reducing the lane ambiguity problem associated with the phase measurement of an essentially continuous phase signal. For example, the basic 10.2 kHz transmissions generate hyperbolic lanes 16 nautical miles wide on the surface of the earth and within the braodcast range of the station. In order to initially position oneself, it is required that the navigator know his position within plus or minus four nautical miles. However, when using two VLF signals together, for example, 10.2 kHz and 13.6 kHz, a virtual difference frequency of 3.4 kHz can be derived. The wave length of the 3.4 kHz signal is much longer, resulting in approximately a 24 nautical mile wide lane width. Similarily, the third frequency, 11-⅓ kHz, when combined with the 10.2 kHz signal can be used to derive a virtual frequency of 1.1-⅓ kHz, the wave length of this frequency being approximately 144 miles. Lane width is an important consideration for two reasons. First, the wider the lane, as dictated by wave length of the transmitted signal or the beat frequency of two signals, the less chance of error arising in predicting an assumed location. That is, a navigator can more easily determine his position within 100 miles than 4 miles. The second consideration is akin to the first in that the receiver must distinguish between lanes and the narrower the lane the greater likelihood of an ambiguity existing between the actual location and the presumed location as determined by the receiver circuitry.

Omega signals are typically weak and frequently submerged in noise. Accordingly, to retrieve useful phase information is necessary that very narrow band widths be employed to extract each signal from the background noise.

Phase locked loop tracking filters are generally used to obtain the required narrow band filter characteristic. To track all received Omega signals requires 24 filters, (i.e., a separate filter for each of the three discrete frequencies from each of the eight Omega stations). These phase locked looped tracking filters can either be implemented by hardware or by a computer program (software) with computer processing.

Figure 1:
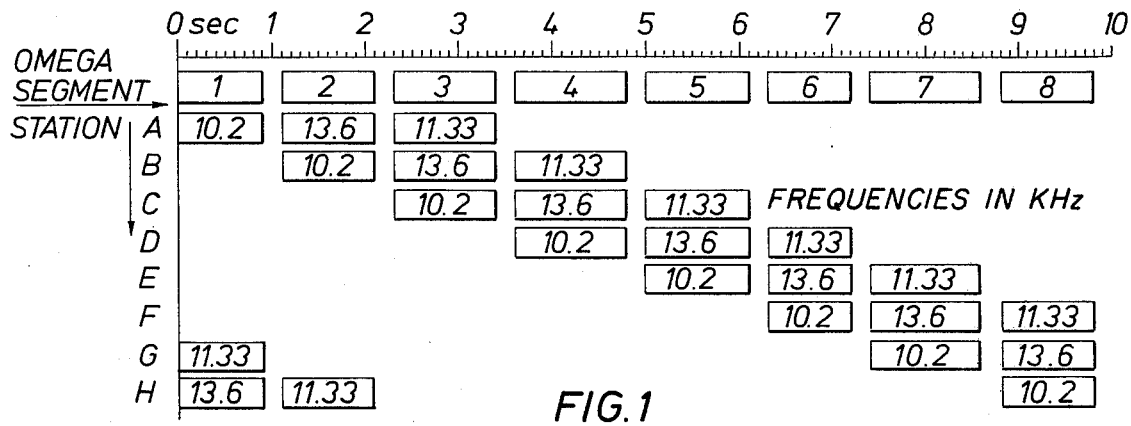
FIG. 1 is a block diagram showing the Omega format for transmitting navigation signals from remotely located Omega transmitters.

Referring to FIG. 1, there is shown the basic Omega signal format, the stations being shown along the ordinate of the graph and time sequence and duration being shown on the abscissa. Frequency $f_1$ (in the Omega system corresponding to 10.2 kHz) is broadcast by station A at time T equals zero. This signal is broadcast for 9/10th of one second, followed by a 2/10ths of one second delay, the delay being between each transmitted signal. At time T equals 1.1 seconds, station A transmits frequency $f_2$, in the Omega system corresponding to 13.6 kHz, and at time T equals 2.3 seconds, station A broadcasts frequency $f_3$, corresponding in the Omega system to 11.33 kHz. Station B commences its broadcast of frequency $f_1$ at times T equals 1.1 seconds, commences its broadcast of frequency $f_2$ at times T equals 2.3 seconds, and commences its broadcast of frequency $f_3$ at times T equals 3.6 seconds. Frequency $f_1$ was broadcast by station A for a total time of 9/10ths of one second, while station B broadcasts frequency $f_1$ for a total time of 1 second. Similarly, station A broadcasts frequency $f_2$ for a total time of one second while station B broadcasts frequency $f_2$ for a total time of 1.1 seconds. Thus, by knowing the sequence of frequencies to be transmitted together with the time of duration of each three discrete signals, a particular station can be identified. As illustrated in FIG. 1, there are eight segments in the ten-second signal format time, the full ten seconds elapsing between the commencement of the transmission of each discrete frequency of each station. At the present time, the eight stations are not fully implemented and operational, however, navigation is possible using only two or three stations at any given time. Thus, while global coverage is not complete, in those sections where two or more stations are receivable, navigation is satisfactory. The description of the processing method of the present invention will be confined to one sequence of signals received from one transmitter.

Figure 2:
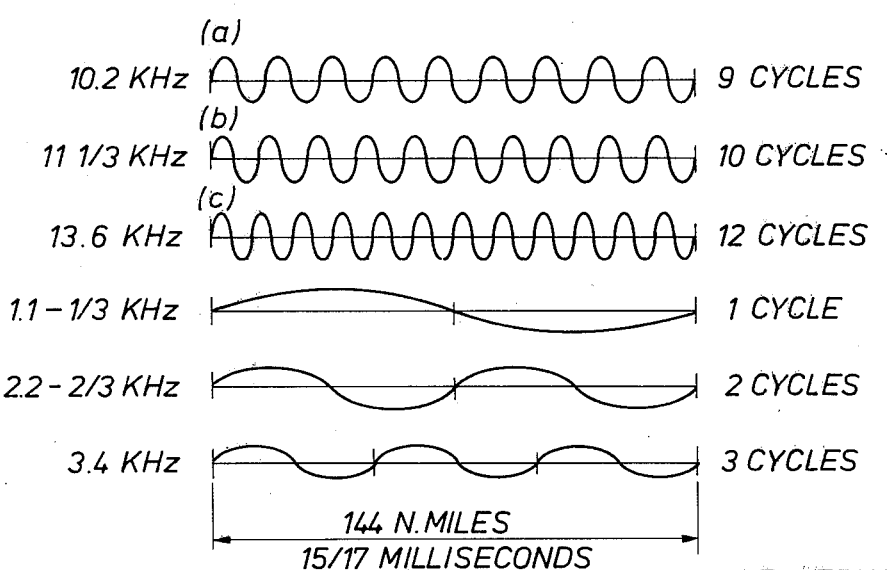
FIG. 2 is a diagram showing the frequency relationships between the prrimary and virtual Omega signals.

As previously referred to, a 144 nautical mile lane width is obtained through determining a virtual frequency resulting from the combining of two of the primary Omega frequencies. This is illustrated in FIG. 2. The three navigational frequencies produce a lane width of approximately 16, 14.4 and 12 nautical miles respectively, for the 10.2, 11-⅓ and 13.6 kHz frequencies. These three frequencies are phase locked to a standard time reference such as UT-2 Universal time such that all three frequencies (being simultaneously transmitted by three different stations) cross zero phase with a positive slope at exactly 0000 hours UT-2. This phase location is illustrated at (a), (b) and (c) of FIG. 2. The use of a frequency ratio 9:10 and 9:12 between the 10.2 and 11.33 and 13.6 kHz signals causes simultaneous crossover to occur every 15/17 millisecond thereafter (FIG. 2(f)). This time interval corresponds to approximately 144 nautical miles at the Omega propagation velocity, which is nearly the speed of light. This 144 mile wide lane signal can be obtained by subtracting the 10.2 kHz signal from the 11-⅓ kHz signal producing a difference or beat frequency of 1.1-⅓ kHz as illustrated at FIG. 2(d). Two additional signals can be obtained by differencing the 13.6 and 11-⅓ to produce 2.2-2/3 kHz and 13.6 and 10.2 to produce 3.4 kHz. These two additional frequencies correspond to lane widths of 72 and 48 nautical miles.

As one travels radially away from a transmitting station of the cycle represented by FIG. 2 will repeat every 144 nautical miles. Thus, if we know the integer lane count for the 144 mile lane, the fractional lane value (the phase of the 1.1-⅓ kHz signal) will resolve the lane ambiguity for the smaller width lanes; i.e., we can go from 144 to 72, from 72 to 48 and from 48 to the single frequency lane widths 16, 14.4 and 12 nautical miles.

Figure 6:
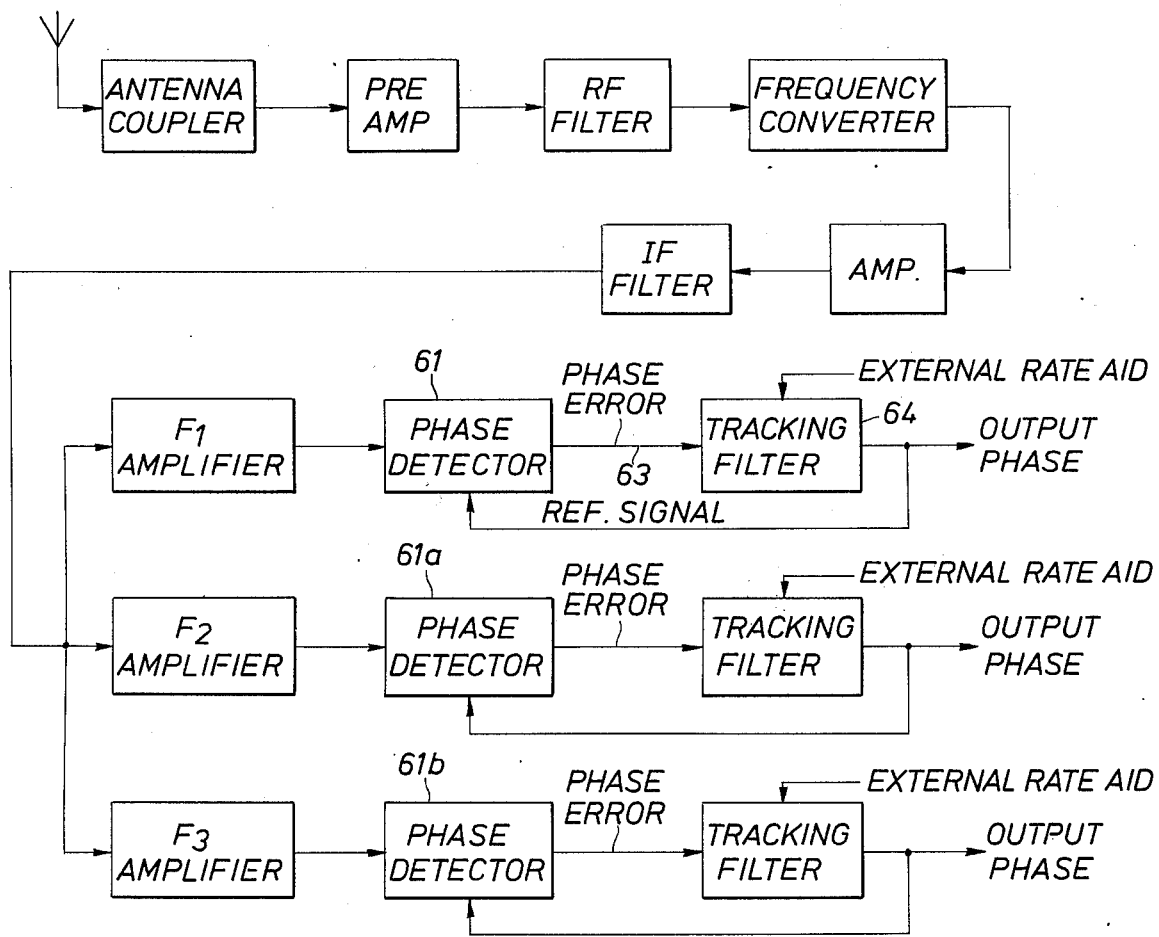
FIG. 6 is a block diagram of an Omega receiver which does not employ cross-coupling.

Referring to FIG. 6, there is illustrated in block diagram form a typical Omega receiver for receiving the plurality of broadcast Omega signals, the signals being transmitted on the three discrete frequencies. The signal is initially received by the antenna, then output from the antenna through an antenna coupler to suitable electronic processing devices, which receive, amplify and filter the signal, then down-convert the signal to a lower frequency such as 1 kHz, amplify and further filter the intermediate (IF) frequency signal and apply it to a limiting amplifier. At the output of the limiting amplifier, there are provided additional integrated circuits for receiving the three frequencies corresponding to 10.2, 13.6 and 11-1/3 kHz. For the 10.2 khz signal, the signal output from the limiting amplifier is detected by phase detector 61, wherein the signal is digitized and a comparison made to a reference signal input at 62. The remaining phase detectors 61a and 61b function similarly to phase detectors 61, 61a and 61b being utilized for receiving the remaining frequency signals transmitted by one station. The reference signal may be a manually or automatically input signal reflecting an assumed position, in which event the phase error output is the difference between the actual location (or measured phase angle) and the assumed location (or assumed phase angle). A phase error signal 63 is output from phase detector 61 to the tracking filter 64. Further input to the tracking period may be external rate aids, such as true air speed and magnetic heading of the carrying vehicle. That is, in order to assist the Omega navigational system in tracking the vehicle utilizing the navigational system, it is possible to provide a signal reflective of, for example, air speed of the carrying vehicle, to the tracking filter in order to more accurately update the reference signal 62. As previously mentioned, there is a 10 second time interval between the time of receiving the 10.2 kHz signal from a particular station. In this ten seconds, an aircraft traveling at 600 knots will move over the surface of the earth approximately 1,000 feet. If, for some reason such as atmospheric interference, a signal is not received for two cycles, the aircraft will have moved approximately one-half mile from its previous position, thus resulting in a large phase error detected between the reference signal, uncorrected by external rate aids, and the phase angle measured by the phase detector for the currently received 10.2 kHz signal. It can be seen that these errors will result in a large ambiguity between the signal. In some instances this ambiguity could be large enough to account for an 8-10 mile error in position, and if only the 10.2 kHz signal were being used for navigation, the output of the receiver would be in error by the width of one lane, an error which can be corrected only by imputing a corrected position received from an alternate navigation system. The external rate aid signals are designed to obviate this large ambiguity by updating the reference signals between cycles of receiving the Omega signals.

Figure 5:
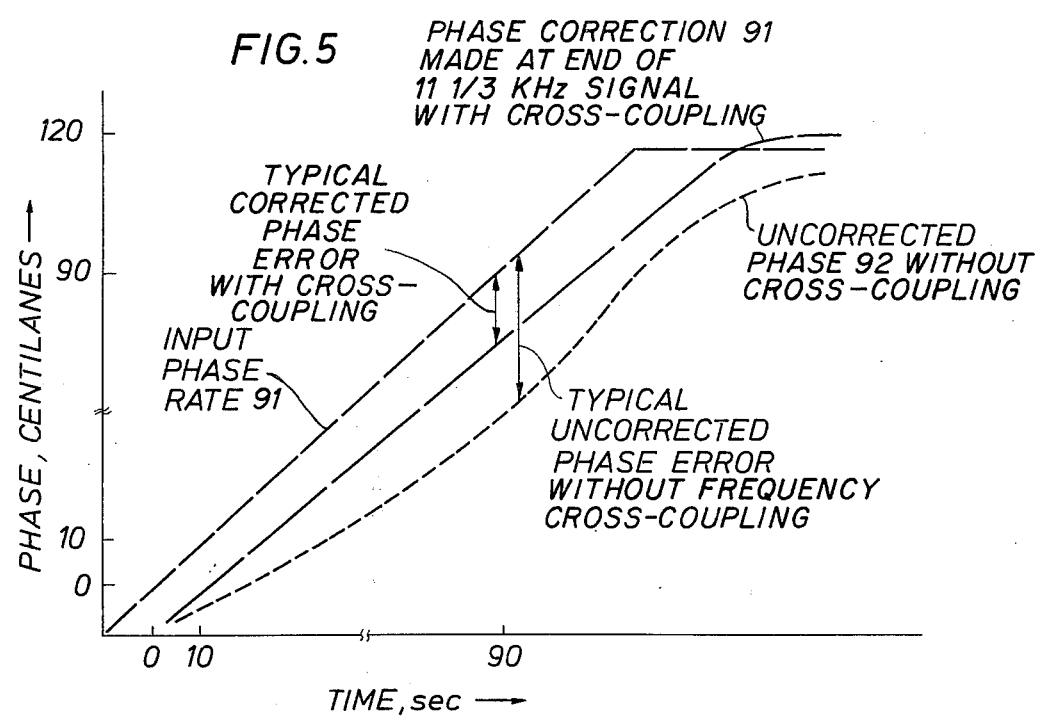
FIG. 5 is a graph illustrating the phase error of an uncorrected signal and the diminished phase error resulting from application.

FIG. 5 illustrates the comparative phase error obtained with two receivers, one conventional receiver without frequency cross-coupling and the other incorporating the cross-coupling technique of the present invention. In FIG. 5, there is illustrated a plot of phase error in centilanes (or 1/100 of a lane) against time after transmitting an Omega signal. The threefold improvement in performance as illustrated is according to a correction method hereinafter described, but generally is accounted for by determining a correction factor from each of the three discrete signals in one sequence and applying that factor to the next reference signal for comparison with the next sequence of Omega signals.

Figure 4:
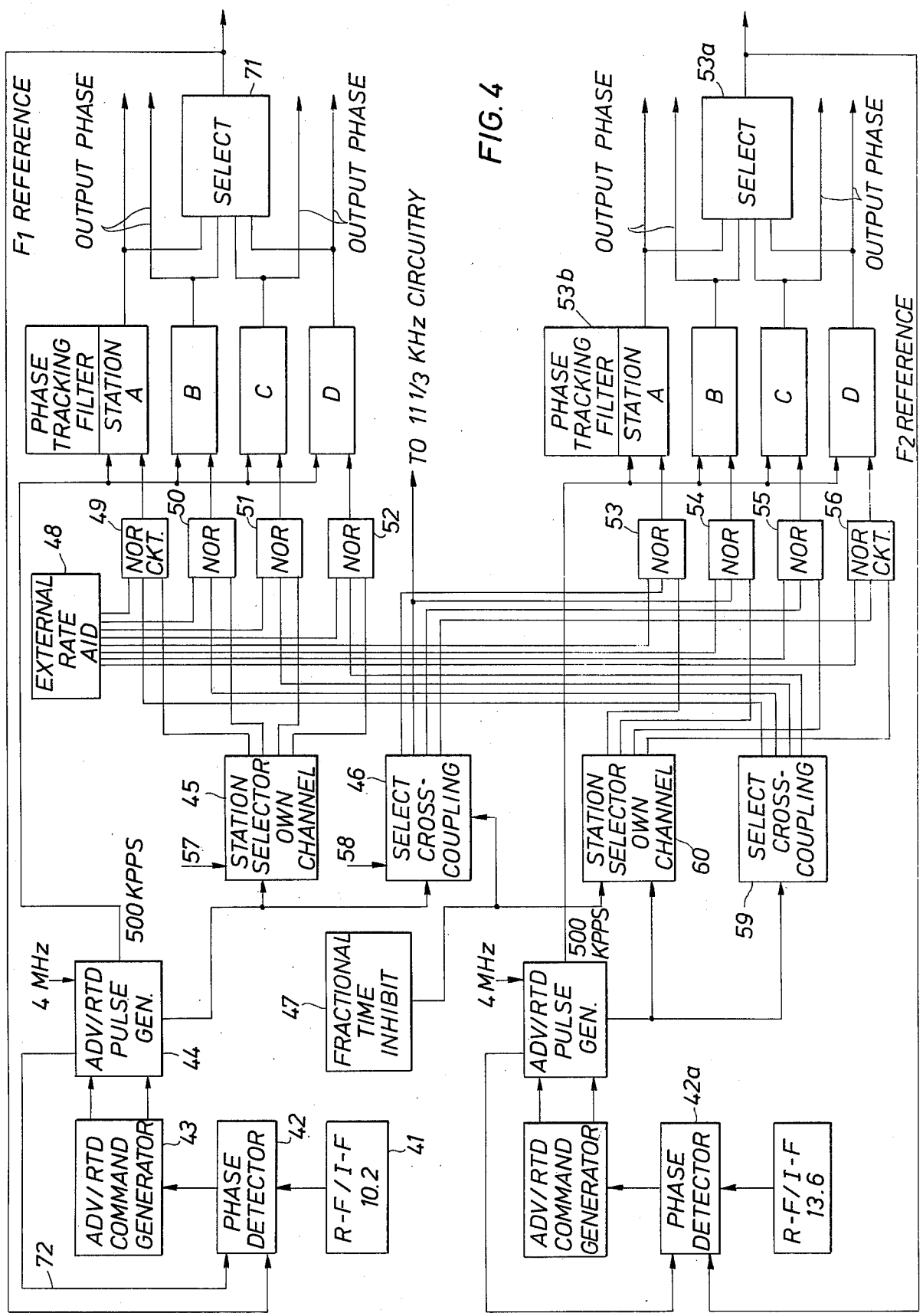
FIG. 4 is a block diagram of another embodiment of the invention utilizing hardwired components.

Referring to FIG. 4, there is illustrated in block diagram form, one embodiment of the present invention. For the sake of simpliciity, the components for processing only two frequencies, corresponding to the 10.2 and 13.6 kHz Omega signals, are shown. It is understood that in the standard Omega receiver there will be identical apparatus to that shown for processing the 11-1/3 kHz signal as well. Comparing FIG. 4 to FIG. 6, all the preliminary steps shown in FIG. 6 for processing the signal to a form suitable for use by the phase detectors have been eliminated in FIG. 4. At block 41, the R-F/I-F conversion is accomplished with the received 10.2 kHz signal appearing at 42 in analog form of an intermediate frequency corresponding to 1 kHz. The synchronous phase detector 42 detects the phase difference between the input and the reference signal. The synchronous phase detector has a filtering capability which insures that the signal available for further processing contains only the coherent part of the received signal, as well as an A-D converter for converting the analog input to digital form. The advance or retard command generator 43 determines whether the phase angle is positive or negative and assigns as arthmetic negative or positive, that is an advance or retard signal, which is to be generated at 44 by the advance/retard pulse generator. The advance/retard pulse generator is supplied with a 500 kpps clock pulse, which is to be intermingled with the advance/retard signal generated at 43. This intermingling of the clock pulse and the phase error signal results in the phase error signal being updated in accord with the $f_1$ reference signal.

The signal output from the pulse generator is then furnished to the station selector, which selects the proper NOR circuit 49–52 for receiving the signal from the proper station. The selector, indicated at 45, selects the proper NOR circuit for receiving signals from the corresponding ground station. It is noted there are four NOR circuits 49–52 illustrated for use with the 102 kHz phase tracking filter. Each NOR circuit receives input corresponding only to one transmitting station. Thus there will be, in a complete system, 24 NOR circuits and 24 phase tracking filters. The remaining NOR circuits and phase tracking filters (beyond four) are deleted from FIG. 4 for clarity. The NOR circuits 49–52 can also be adapted to receive an external rate aid signal, as indicated at 48, for providing digital input characteristic of certain measured data, for example, corresponding to true air speed and the magnetic heading of the carrying vvehicle. As can be seen in FIG. 4, the NOR circuits 49–52 for the 10.2 kHz phase tracking filters receive input, first from the select own channel station selector 45, second from the external rate aid signal function 48, and last from the select cross-coupling selector 59. Although not shown, there will be a select cross-coupling selector associated with the 11-1/3 kHz circuitry which will also input to NOR circuits 49–52 and 53–56. The signals output by the select cross-coupling selector 59 are generated by the apparatus associated with the frequencies apart from the 10.2 kHz signal input. Similarly, each NOR circuit in the 13.6 kHz receiver section receives input from four sources: 1) external rate air 48; 2) the station selector (own channel) associated with that portion of the receiver processing the 13.6 kHz signal; 3) select cross-coupling selector associated with the 10.2 kHz receiver section; and 4) select cross-coupling selector associated with the 11-1/3 kHz receiver section.

Referring again to the upper portion of FIG. 4, the NOR circuits 49–52 output the sum of their input signals to the phase tracking filters A, B, C and D. The notation A, B, C and D corresponds to the station identification A, B, C, D etc. of FIG. 1. The output of these phase tracking filters then is supplied to the station selector 71 which multiplex is the appropriate station-selected reference signal back to the synchronous phase detector 42. There is also shown an auxiliary loop circuit 72, which serves to reset the synchronous phase detector to an equilibrium condition after the generation of each advance/retard pulse. Thus, as seen in FIG. 4, phase-locked phase tracking of the $f_1$ reference signal applied to the synchronous phase detector 42 used for 10.2 kHz signal phase reception utilizes both own-channel input phase correction (via phase detector 42), the advance/retard command generator 43, the advance/retard pulse generator 44, and own-channel station selector to the selected station phase tracking filter) and supplemental cross-coupled input phase correction from the 13.6 kHz signal channel (via phase detector 42a and associated advance/retard command generator, pulse generator and station selector cross-coupling 59 to the same selected station phase tracking filter). Although FIG. 4 shhows only 10.2 khz and 13.6 kHz channels, it is apparent that a similar cross-coupling input phase correction could be obtained from an 11-⅓ khz frequency channel. Futher, phase-locked phase tracking of the $f_2$ reference signal, applied to the phase detector 42a used for 13.6 kHz signal phase reception, utilizes similar own-channel input phase and cross-coupled input phase correction for the corresponding phase tracking filter 53b used for updating the $f_2$ reference signals. The system works similarly for each of the three portions of the signal receiver corresponding to the three navigational frequencies, 10.2, 13.6 and 11-⅓ kHz.

The fractional time inhibit apparatus 47 is utilized to control the amount of the cross-coupled correction factor from one frequency that is applied to an adjacent frequency. For example, it may be desired to apply only a portion of the phase error correction derived from 13.6 kHz to the 10.2 kHz signal. The fractional time inhibit 47 would accomplish this function.

Of course, as illustrated in FIG. 4, there are only two frequencies provided for. It is understood that the circuitry could be readily provided for each of the three frequencies. Further there is illustrated only stations A, B, C and D corresponding to the phase tracking loop filters, while it is understood there will be a total of eight of these stations in the completed system. The processing of signals from several transmitting stations does not form a part of this invention per se, as the cross-coupling technique is applied only to signals received from one station.

Referring to FIG. 5, there is shown the phase of the input signal plotted against time after the signal is generated. The input signal, as indicated by the 45° slope of the input phase rate plot is the reference phase as it is transmitted. The first plot shown is with the signal uncorrected either for external rate aid or for errors calculated from the remaining input frequencies. The curve indicated as phase corrected in calculated from data derived at the end of the 11-⅓ kHz signal, that is after receiving the three sequentially transmitted signals, with the cross-coupling method of the present invention employed to apply the corrected phase error reference signal to each of the three discrete signals in the next received sequence from that station.

The handling of the cross-coupling between frequencies can also be expressed mathematically. Defining the cross-coupling coefficient as $C_{ij}$, the incremental changes in phase tracking filter output as affected by the observed phase error can be defined by expressions of the form:

$\Delta\phi_1 = G'(s)[C_{11} * E_1 + C_{21} * E_2 + C_{31} * E_3]$ (for 10.2 kHz tracker), $\Delta\phi_2 = G'(s)[C_{12} * E_1 + C_{22} * E_2 + C_{32} * E_3]$ (for 13.6 kHz tracker), $\Delta\phi_3 = G'(s)[C_{13} * E_1 + C_{23} * E_2 + C_{33} * E_3]$ (for 11-⅓ kHz tracker).

Where, $E_1$, $E_2$ and $E_3$ are the observed phase errors from the three phase detectors (for the separate 10.2, 13.6 and 11-⅓ kHz channels); G(s) is the proportional to the tracking loop gain; and $\Delta\phi_1$, $\Delta\phi_2$ and $\Delta\phi_3$ represent incremental changes in tracking filter output in response to the observed phase errors. It would be possible to set $C_{11} = C_{22} = C_{33} = 1$; the other $C_{ij}$ coefficients then indicating the level of cross-coupling. It is seen that a three fold improvement in signal to noise ratio (roughly 5 decibels) in each channel is attainable with unity cross-couplings; reduction of cross-coupling to 0.8 yields comparable performance and enables each tracker to respond more rapidly to its own phase error input signal.

The 5 decible signal enhancement factor applies when the incoming discrete frequency Omega signals (at 10.2, 13.6 and 11-⅓ kHz) from a selected station are identical in signal to noise. Under the more usual situation in which the separate frequency signals differ in signal strength, the advantages of frequency cross-coupling become overwhelming. It is generally observed that the 10.2 kHz signals are significantly weaker than the 13.6 kHz signals at extreme ranges. Under such conditions, the conventional phase tracker approach may show complete loss of tracking in the 10.2 kHz channel even though reliable tracking is still being maintained on the neighborimg 13.6 or 11-⅓ khz frequencies. This limitation contributes to the unreliability of a conventional navigational receiver system in which the cross-coupling of the present invention is not employed.

Figure 3:
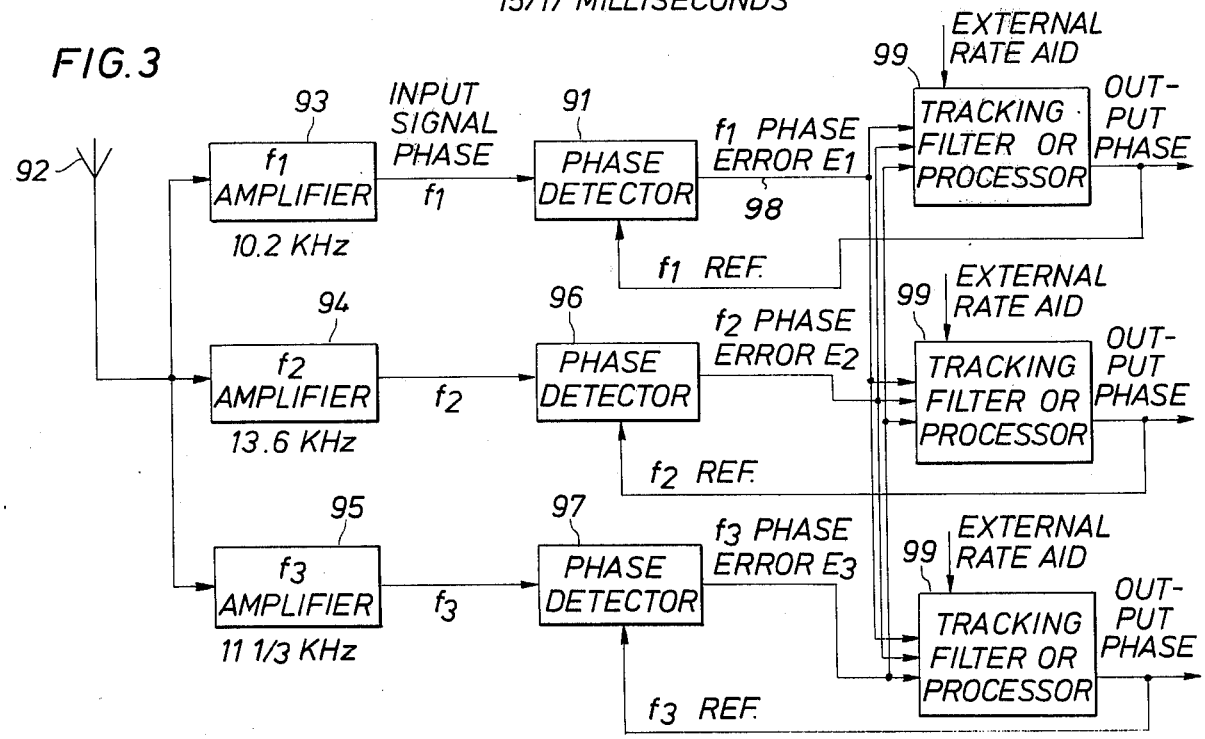
FIG. 3 is a block diagram showing one embodiment of the present invention with computer hardware/software processing.

Referring to FIG. 3, a preferred embodiment of this invention is illustrated. There is shown in block diagram form the components necessary for processing the phase error signals in a computer hardware/software environment. The block diagram corresponds to FIG. 4 insofar as the components 42 of FIG. 4 and 91 of FIG. 3 are concerned. It is noted that FIG. 3 illustrates processing components for each of the three discrete Omega frequencies while FIG. 4 illustrates hardwired components for processing only two discrete frequencies. The deletion of the third frequency in FIG. 4 is merely for clarity in illustrating the components. Referring again to FIG. 3, the received signals are first detected by antenna 92, then passed through appropriate circuitry to amplifiers 93, 94 and 95, the amplifiers accepting only narrow band width signals corresponding to frequencies, $f_1$, $f_2$ and $f_3$. The processing of the signal from antenna 92 to the phase detectors 92, 96 and 97 may be accomplished through components similar to that described in conjunction with FIG. 6. As the input signal for each Omega station is input to phase detector 91, there is a comparison made between the input signal phase $f_1$ and the corresponding $f_1$ reference signal for that station. Phase detector 91 compares the input signal phase $f_1$ and the $f_1$ reference signal and outputs and $f_1$ phase error, $E_1$ in line 98. The line 98 inputs the $f_1$ phase error $E_1$ to a tracking filter or computer processor 99. The computer program for performing the cross-coupling of the three signals is appended hereto as Attachment A. The program listing is shown for the method of determining a phase error correction after receiving all three discrete signals, then applying that correction to the next received sequence of signals. It is understood that the method of cross-coupling the phase error signals to the next received signal, as opposed to the next received sequence of signals, would only require a modification to the program as shown in Attachment A, a modification easily within the talents of one skilled in programming a computing machine.

Figure 7:
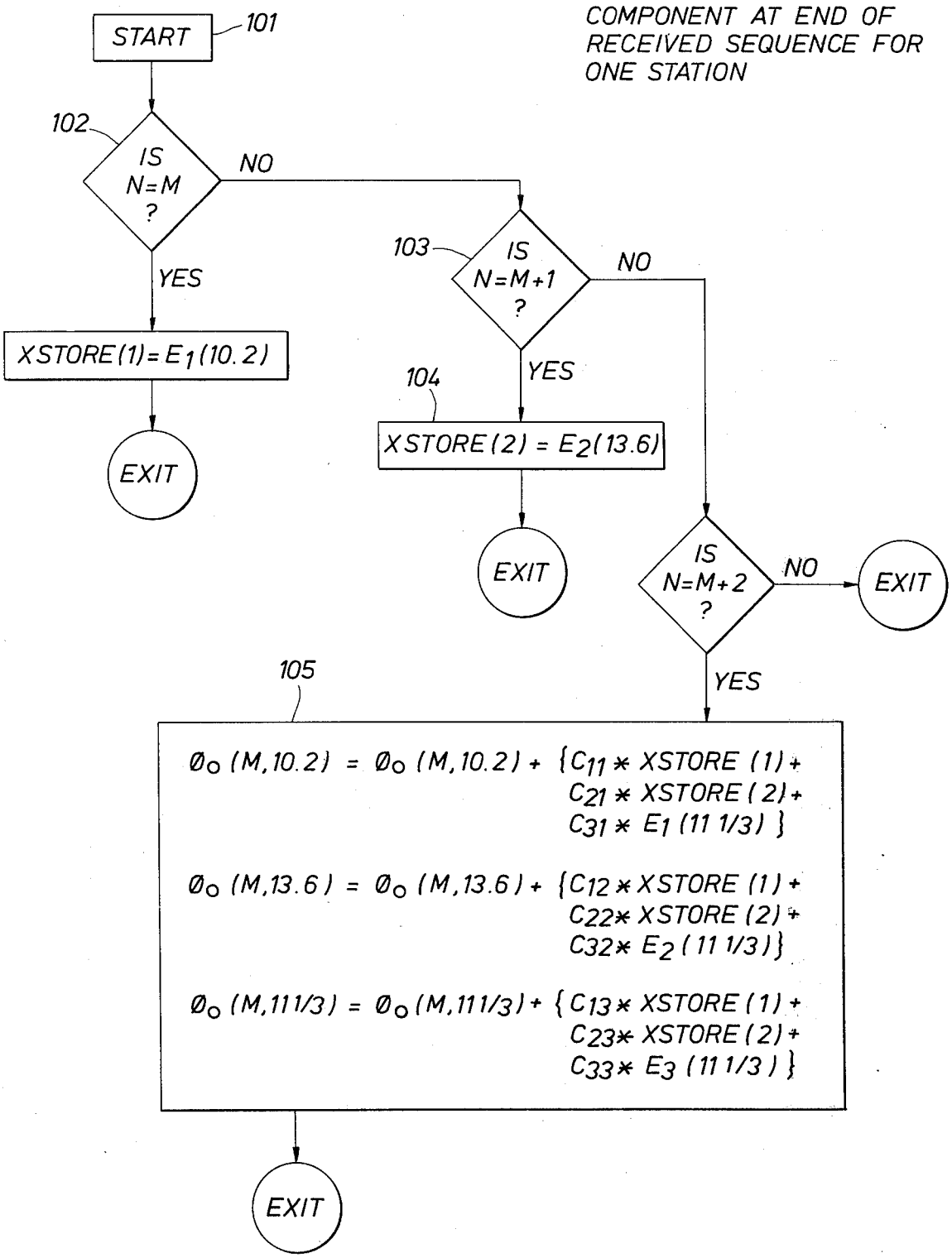
FIG. 7 is a block diagram of the processing sequence utilized in the hardware/software embodiment of FIG. 3.
Figure 8:
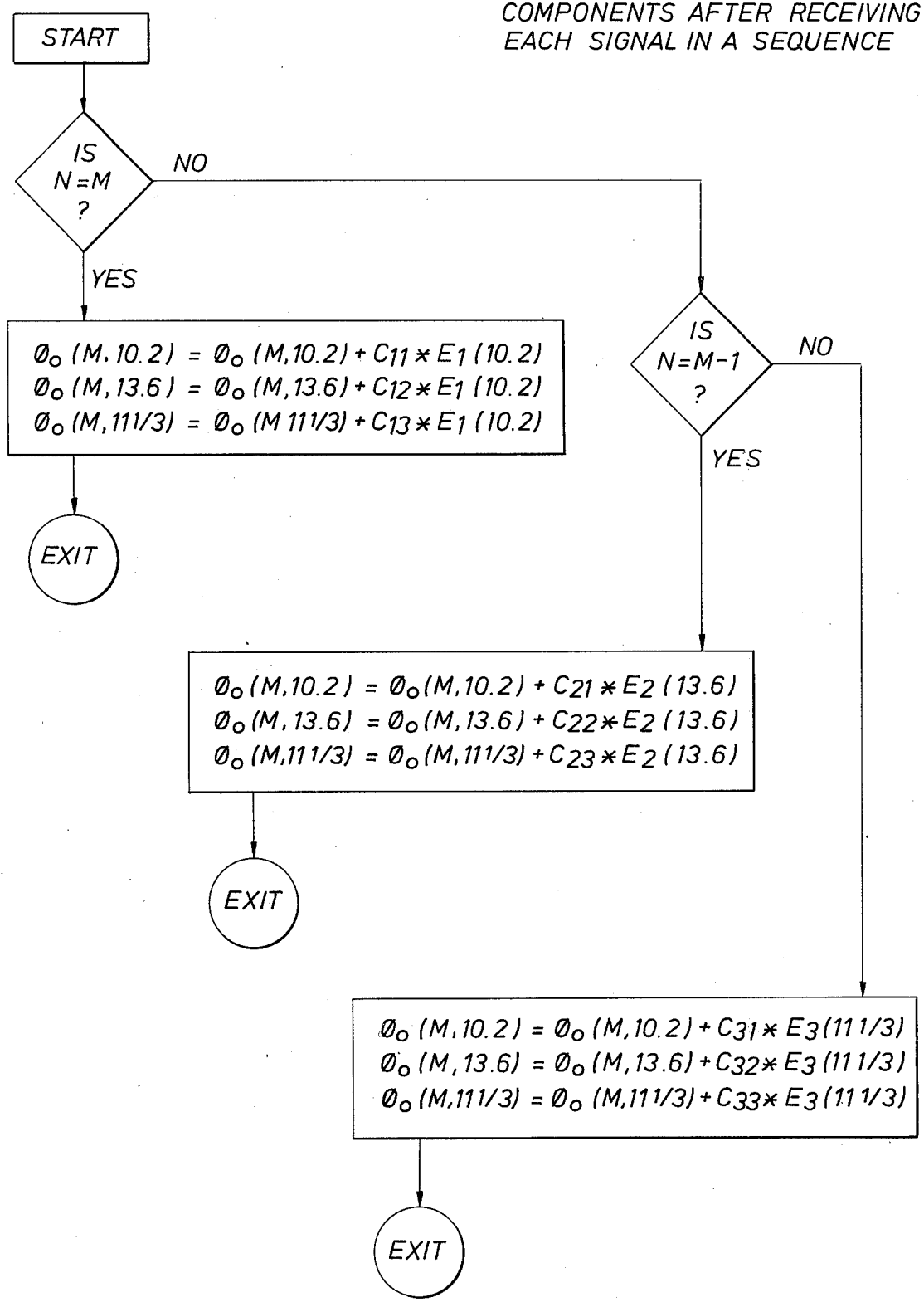
FIG. 8 illustrates an alternative method of processing the Omega signals, to that shown in FIG. 7.

For additional clarity the portion of the computer program related to the cross-coupling of the phase error signals $E_1$, $E_2$ and $E_3$ is illustrated in FIGS. 7 and 8. Referring first to FIG. 7, there is shown in block diagram form the processing of each of the three discrete frequencies for determining the phase errors $E_1$, $E_2$ and $E_3$, storing the values determined and applying them to subsequent input phase signals $f_1$, $f_2$ and $f_3$ through the $f_1$, $f_2$ and $f_3$ reference signals applied to the phase detectors 91, 96 and 97 in FIG. 3. This method is that first described above and consists of applying a correction factor to the next received sequence of signals. In the cross-coupling processing sequence, the program sequence is initiated at block 101, moves to block 102 wherein the query is made, in N = to M? N corresponds to the segment number in the Omega format while M refers to the station number. As will be recalled from FIG. 1, there are eight Omega segments in the transmitting sequence and eight Omega stations, denoted by the letters A-H. For purposes of this numerical processing sequence, each station is assigned a numerical value. If the query of block 102 is affirmative, that is the sequence number, for example, 1, corresponds to the station number A (assigned numerical value 1), then the phase error $E_1$ is stored for subsequent recall. Upon receiving the next signal for processing, which signal would correspond to segment 2 from station 1, the query is made at block 102, and a negative reply results in transfer of the sequence to block 103. The query is then made, is N equal M + 1. Since segment 2 is the segment being processed, and M has a value of 1, there will be an affirmative response resulting in transfer of the programmed sequence to block 104, and the storage of a phase error signal $E_2$ corresponding to that associated with the second received frequency 13.6 kHz.

Similarly, a phase error signal $E_3$ is determined for the 11-⅓ kHz Omega signal, the program then transferring to block 105 for applying the phase error correction to each phase detector through the reference inputs for processing of the next three discrete frequencies. It is observed in block 105 that the term to the left of the equals sign is the updated phase error signal to be applied to the next received input signal phase while the terms to the right reflect the old value of the phase error for that frequency plus the correction term derived from the measurement of the phase errors, $E_1$, $E_2$ and $E_3$. It is seen that the method illustrated in block 105 of FIG. 7 applies a correction to each of the three discrete Omega frequencies after receipt of the 11-⅓ kHz signal. That is, there is no correction applied to the 13.6 and 11-⅓ kHz error signals, until after a complete sequence is received.

Referrring to FIG. 8, there is illustrated the method in block diagram seequence for applying a correction to each of the received Omega frequencies, with the correction being determined from the phase error associated with the next preceding signal. The two illustrated methods differ only in the manner of data manipulation, with the results derived from each method being approximately the same.

Thus, as illustrated in FIGS. 3, 7 and 8, the method of cross-coupling received multiple frequency signals is accomplished by first receiving the discrete frequency signal associated with the 10.2 kHz frequency, then amplifying and filtering the signal for further processing. The signal is then input to a phase detector for comparing the signal to a first reference signal, as illustrated in FIG. 4 at 42. The first phase error signal determined from the comparison at phase detector 42 is input to a first phase locked tracking filter or processor 99 (FIG. 3) through appropriate advance and retard pulse command and generating components 43 and 44 (not shown in FIG. 3). After receiving the second discrete frequency, corresponding to 13.6 kHz, the second signal is like-wise amplified and filtered for futher processing. As previously mentioned, the amplifying and filtering process includes in one embodiment of this invention, changing the signal to a frequency of 1 kHz through an appropriate frequency converter. The second signal is then input to the second phase detector for comparison with a second reference signal $f_2$. With cross-coupling selected, the input to the second reference signal $f_2$ is derived through NOR circuit 53 (FIG. 4) from the select cross-coupling selector 46, the external rate aid 48, and the station selector, own-channel coupling 60. The selection of cross-coupling applies the phase error signal from phase detector 42 to NOR circuitry 53 and thence to selector 53a through the phase tracking filter for station A, 53b. The $f_2$ reference signal then is cross-coupled to the phase detector 42 which outputs a phase error reflective of the received 10.2 kHz signal. Phase detector 42a then compares the I-F signal from the 13.6 kHz Omega signal with the $f_2$ reference phase error signal from the 10.2 kHz Omega input signal and updates the 13.6 kHz phase error signal. Similarly, the output of the second phase detector can be cross-coupled to the first phase locked tracking filter through NOR circuits 49–52. In similar manner, the phase error signal of phase detector 42 can be applied not only to phase detector 42a but a phase detector (not shown) utilized in processing the 11-⅓ kHz signal input.

The cross-coupling concept offers a powerful technique which overcomes the basic difficiency of individual and uncoupled phase tracking loops. With cross-coupling, temporary loss of a particular frequency signal is not catastrophic; the coupled phase errror information from the neighboring frequency channels continues to drive all phase tracking filters (including the one having a loss of its "primary" input signal). As an example, in the case where the 10.2 kHz signal disappears for a time, the supplemental error signals ffrom a 13.6 and 11-⅓ kHz channels will provide roughly 90% of the required rateaid to the 10.2 kHz phase tracking filter, using a reasonable cross-coupling coefficient of 0.8.

Not all cross-coupling coefficience must be used. One can be used to minimize error in another, that is 13.6 can be used exclusively to correct 10.2 and therefore update the 10.2 signal more often. The 13.6 signal would not be used for primary navigation at all in this mode of operation.

it is also important to note that while the Omega system described is a sequential transmission system, the method described herein can also be utilized with navigational systems utilizing simultaneous frequency transmission where multiple frequencies are transmitted from multiple stations simultaneously.

As previously mentioned, there are two schemes which may be employed for cross-coupling. In one method, the individual phase errors for the three frequency channels are accumulated until after the 11–1/3 kHz signals in the multiple frequency sequence have been detected; a combined phase reference corrections is determined which is then applied to each of the discrete frequencies received in the next received signal sequence.

In the other method, the observed error for each frequency is used in that sequence to update each of the next received signals in the multiple frequency sequence.

Applying corrections all at one time, the former method described above, appears to produce slightly better tracking performance than the immediate segment by segment correction approach. However, either method produces satisfactory and greatly improved results from those previously available.

The operational benefits of cross-coupling are most dramatic under weak signal conditions, or whenever one or even two of the three input signals is very noisy. When all three channels are of comparable quality but weak, symmetric cross-coupling results in a nearly three-fold signal/noise enhancement.

Furthermore, when the signals are of unequal quality or intermittent, the stronger channels can provide significant mutual aid to the weak channel. As an example, consider a case in which the 10.2 kHz signals disappear for a time. It can be shown (using a FIG. 2 coupling coefficient) that the error and lag in the 13.6 and 11–1/3 channels will increase slightly, and these two channels will then provide about 90% of the required rate aid to the 10.2 kHz tracking reference. Thus, if we already have reduced the uncompensated rate aid to plus or minus 60 knots (by means of aircraft heading and true air speed data), the residual drift in the 10.2 phase reference is only 6.66 knots. It would take more than an hour for this channel to drift plus or minus one-half wave length. On the other hand, without the cross-coupling, the external rate aid would be inadequate after some eight minutes of time, and satisfactory phase tracking would be lost.

What is claimed is:

1. In a multiple frequency phase tracking receiver, a method of cross-coupling receiving differing frequency signals which method optimizes intrinsic phase relationships between sets of discrete frequency signals transmitted from a single location, the method comprising the steps of:
    a. receiving a plurality of discrete frequency signals, said signals being then amplified and filtered for further processing;
    b. inputting each of said discrete frequencies to a plurality of phase detectors for detecting a phase difference between each of said discrete frequencies and a reference signal, the phase difference obtained from each phase detector comprising an output phase error signal;
    c. combining the output phase error signals obtained from each of the phase detectors;
    d. supplying the signal obtained from step (c) to each of the phase detectors as reference signals for comparison with each of said discrete frequency signals in a next received sequence; and
    e. periodically sampling the output phase error signals for obtaining an indication of the magnitude or phase difference of said signals.

2. The method according to claim 1, wherein said plurality of discrete frequency signals comprises at least two signals received sequentially.

3. The method according to claim 1, wherein said plurality of discrete frequency signals comprises at least two signals received simultaneously.

4. In a multiple frequency processing apparatus, a method of cross-coupling received discrete frequency signals, the method comprising the steps of:
    a. receiving a first discrete frequency signals, said signal being then amplified and filtered for further processing;
    b. inputting said first signal to a first phase detector for detecting a phase difference between said first signal and a first reference signal, said phase difference comprising a first output phase error signal;
    c. receiving a second discrete frequency signal, said signal being suitably amplified and filtered for further processing;
    d. inputting said second discrete frequency signal to a second phase detector;
    e. applying the first phase error signal as a second reference signal to the second phase detector for measuring the phase difference between said second discrete frequency signal and said first phase error signal for obtaining a second output phase error signal; and
    f. periodically sampling the first and second output phase error signals for providing a display indication of said output signals.

5. The method of claim 4, wherein:
    a. a third discrete frequency signal is received, then amplified and filtered for further processing;
    b. said third discrete frequency signal is input to a third phase detector for detecting the phase difference between said third signal and a third reference signal;
    c. cross-coupling the output of said third phase detector to the output of said first and second phase detectors;
    d. cross-coupling the output of said first phase detector to the output of said second and third phase detectors; and
    e. cross-coupling the output of said second phase detector to the output of said first and third phase detector, said cross-coupling of steps (c), (d) and (e) for updating the reference signal to the respective phase detectors as required.

6. In a multiple frequency phase tracking receiver, a method of cross-coupling received differing frequency signals which method optimized intrinsic phase relationships between sets of discrete frequency signals transmitted from a single location, the method comprising the stepd of:
    a. receiving a plurality of discrete frequency signals, from a selected transmitting station said signals being then amplified and filtered for further processing;
    b. inputting each of said discrete frequencies to a plurality of phase detectors for detecting a phase difference between each of said discrete frequency signals and a reference signal, the detected phase difference obtained from each phase detector comprising an output phase error signal;

c. combining, through weighted summation, the output phase error signals from each of the phase detectors to obtain a set of composite phase error signals;

d. utilizing each of said composite phase error signals obtained from step (c) to adjust the phase of the corresponding reference signal applied to each of the phase detectors; and e. further processing of said first and second reference signals for obtaining line-of-position information.

7. The method according to claim 6, wherein said plurality of discrete frequency signals comprises at least two signals received sequentially.

8. The method according to claim 6, wherein said plurality of discrere frequency signals comprises at least two signals received simultaneously.

9. In a multiple frequency processing apparatus, a method of cross-coupling received discrete frequency signals radiated from a selected transmitting site, the method comprising the steps of:

a. receiving a first discrete frequency signal, said signal being then amplified and filtered for further processing;

b. inputting said first signal to a first phase detector for detecting a phase difference between said first signal and a first reference signal, said phase difference comprising a first output phase error signal;

c. receiving a second discrete frequency signal, said signal being suitable amplified and filtered for further processing;

d. inputting said second discrete frequency signal to a second phase detector for detecting a phase difference between said second signal and a reference signal, said phase difference comprising a second output phase error signal;

e. coupling said first phase error signal to the reference signal for the first phase detector so as to obtain a primary correction in phase of said first reference signal;

f. cross-coupling of said second phase error signal to the reference signal of the first phase detector so as to obtain a secondary correction in phase of said first reference signal;

g. coupling of said second phase error signal to the reference signal of the second phase detector so as to obtain a primary correction in phase of said second reference signal;

h. cross-coupling of said first phase error signal to the reference signal of the second phase detector so as to obtain a secondary correction in phase of the second reference signal; and i. further processing of the said first and second reference signals for obtaining line-of-position information.

10. The method of claim 9, wherein:

a. a third discrete frequency signal is received, then amplified and filtered for further processing;

b. said third discrete frequency signal is input to a third phase detector for detecting the phase difference between said third signal and a third reference signal;

c. cross-coupling the output of said third phase detector to the output of said first and second phase detectors;

d. cross-coupling the output of said first phase detector ro the output of said second and third phase detectors;

e. cross-coupling the output of said second phase detector to the output of said first and third phase detectors; and f. utilizing said cross-coupling of Steps (c), (d) and (e) for updating the said reference signals to the respective phase detectors.

* * * * *

UNITED STATES PATENT OFFICE
CERTIFICATE OF CORRECTION

Patent No. 3,996,515      Dated December 7, 1976

Inventor(s) Otto J. Baltzer et al.      Page 1 of 2

It is certified that error appears in the above-identified patent and that said Letters Patent are hereby corrected as shown below:

Col. 3, line 35, before "4" should in inserted --within--.

Col. 5, line 56, after "Omega signal." should be inserted --An input phase rate 91 of one centilane per second is shown initiated at t = o and maintained until t = 120 seconds. It is noted that a phase rate of 1 centilane per second at the 10.2 kHz Omega frequency corresponds to a radial velocity component of approximately 600 knots. With this input phase rate, the output response of each discrete frequency phase tracking channel of the conventional receiver shows a phase error 92 approaching 0.3 lane (approximately 5 nautical miles). The corresponding phase error in tracking response 93 for an Omega receiver that is corrected by means of multiple frequency cross-coupling is reduced to approximately 0.1 lane--.

Col. 6, line 17, "as" should be --an--.

Col. 6, line 33, "102" should be --10.2--.

Col. 6, line 57, "air" should be --aid--.

Col. 7, line 19, "khz" should be --kHz--.

UNITED STATES PATENT OFFICE
CERTIFICATE OF CORRECTION

Patent No. 3,996,515     Dated December 7, 1976

Inventor(s) Otto J. Baltzer et al.     Page 2 of 2

It is certified that error appears in the above-identified patent and that said Letters Patent are hereby corrected as shown below:

Col. 7, line 56, "in" should be --is--.

Col. 9, line 64, before "error" should be inserted --phase--.

Signed and Sealed this thirtieth Day of August 1977

[SEAL]

Attest:

RUTH C. MASON
*Attesting Officer*

C. MARSHALL DANN
*Commissioner of Patents and Trademarks*